United States Patent [19]

York

[11] Patent Number: 4,530,385
[45] Date of Patent: Jul. 23, 1985

[54] APPARATUS FOR REMOVING TREE STUMPS

[76] Inventor: Norman N. York, 3705 Broadway, Houston, Tex. 77017

[21] Appl. No.: 581,917

[22] Filed: Feb. 21, 1984

[51] Int. Cl.³ .......................... B02C 1/04; A01G 23/08
[52] U.S. Cl. ........................................ 144/2 N; 37/92; 37/189; 241/101.7; 241/278 R
[58] Field of Search ................... 144/2 N; 37/2 R, 91, 37/92, 189; 241/101.7, 188 R, 188 A, 244, 250, 251, 252, 278

[56] References Cited

U.S. PATENT DOCUMENTS 2,887,134  5/1959  Bartlett ............................... 144/2 N
2,912,022  11/1959  Ver Ploeg et al. ................. 144/2 N
3,911,979  10/1975  Rousseau ............................ 144/2 N Primary Examiner—W. D. Bray
Attorney, Agent, or Firm—Gunn, Lee & Jackson

[57] ABSTRACT

A tractor supported and driven mechanism for removing tree stumps which cause linear movement of a rotary cutter disk for milling away stumps from the side portions thereof. The mechanism incorporates a frame structure having a hydraulically driven slide supported and guided by parallel structural members of the frame. The cutter disk is rotatably supported on the slide structure and is driven by the power take-off of the tractor by means of an elongated non-circular drive shaft which is received in driving engagement by a central non-circular drive opening of the cutter. The cutter disk is movable along the length of the non-circular drive shaft while maintaining driving engagement therewith.

16 Claims, 6 Drawing Figures

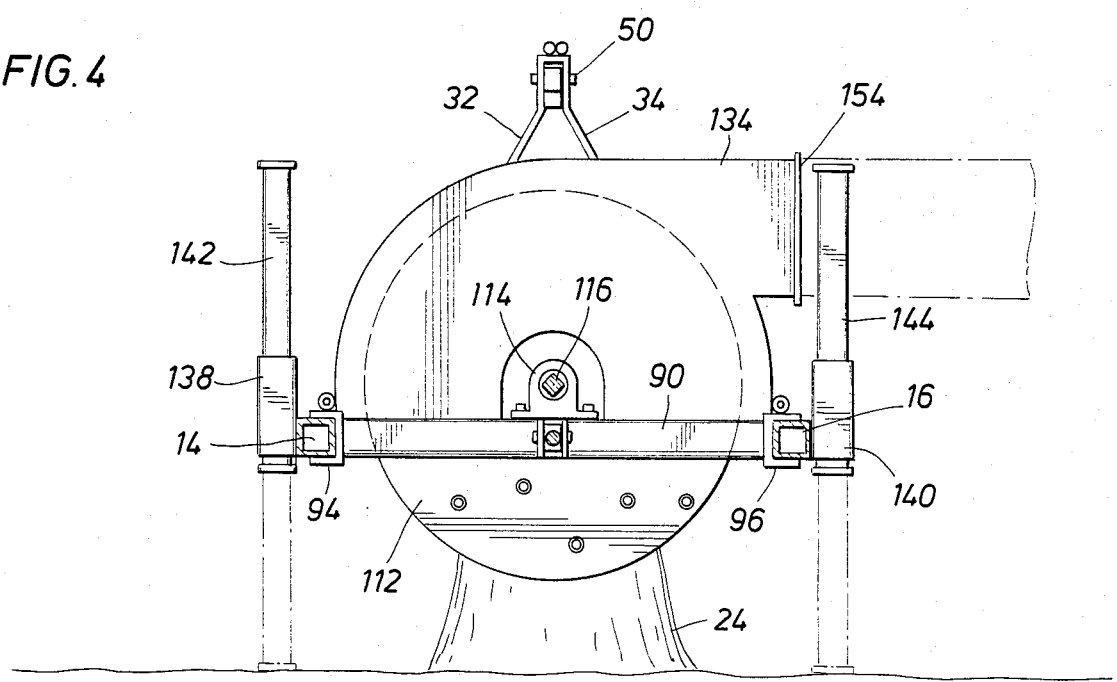
FIG. 4
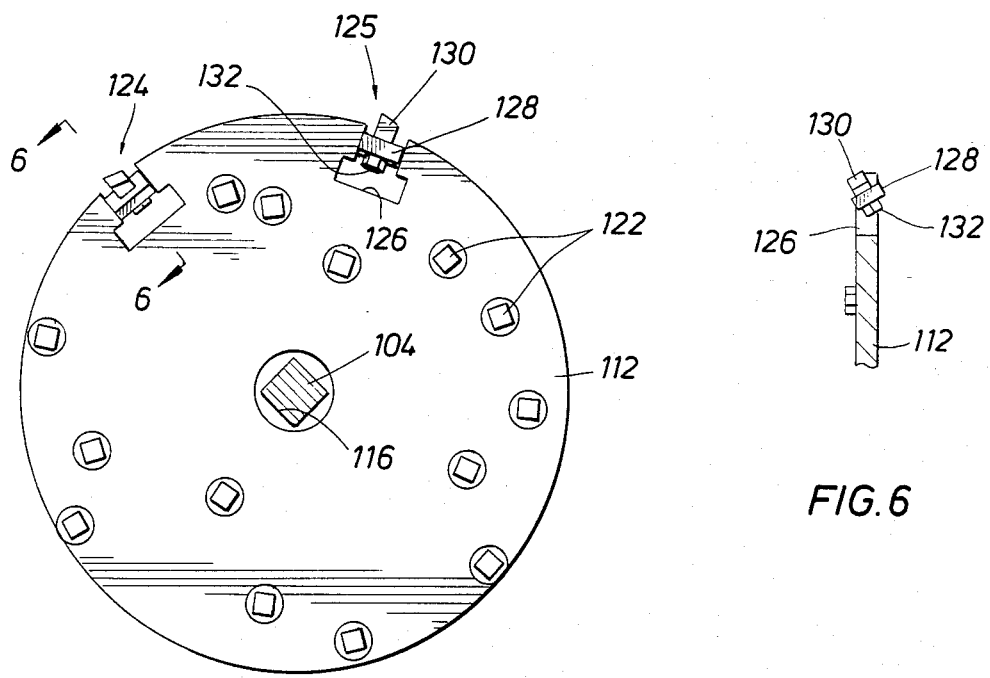
FIG. 5
FIG. 6

4,530,385

APPARATUS FOR REMOVING TREE STUMPS

FIELD OF THE INVENTION

This invention relates generally to devices for removing tree stumps and, more particularly, is directed to the provision of tree stump removal apparatus which is supported by the standard three point hitch of a tractor and is driven by the power take-off and hydraulic supply systems of the tractor.

BACKGROUND OF THE INVENTION

After trees have been cut, such as during tree harvesting operations or land clearing operations, there typically remains a section of tree stem extending above the surface of the ground. This section of the tree stem, typically referred to as a tree stump, results due to cutting of the tree at a level above the ground where the trunk or stem of the tree begins to taper outwardly to the root portion thereof. In many cases tree stumps are left for natural environmental decomposition (such as weather, insects and the like). Tree stumps are also removed by explosives, although this is a dangerous and expensive practice.

Should it become desirable to use the ground surface before the tree stumps have time for natural decomposition, the tree stumps can present a hazard to the intended user. It may, therefore, become desirable to accomplish efficient removal of the tree stumps to a level at or slightly below the grade level of the ground without causing undue disturbance of the ground such as would occur during stump removal by such mechanical implements as dozers, or by blasting, etc.

THE PRIOR ART

As is clear from a review of the prior art, many different types of stump removers have been developed. For the most part, these devices are of complicated and expensive construction. The strump removal machine of Bartlett, U.S. Pat. No. 2,887,134, and Pickel, U.S. Pat. No. 3,732,905, are supported by the three point hitch structure of a tractor and driven by the power take-off system of the tractor. U.S. Pat. No. 2,912,022 of Ver Ploeg et al shows a tractor drawn wheel mounted stump cutter device. U.S. Pat. No. 2,927,613 of Franzen et al shows a tractor supported stump cutter having plural saw blades for cutting of the stump. U.S. Pat. No. 3,028,691 of Jeffres discloses a tractor-supported device having a chain type cutter driven in rotary manner. Other stump cutting devices of interest are disclosed by U.S. Pat. Nos. 3,044,509 of Kehler, 3,308,860 of Deshano, 3,568,740 of Speakman, 3,911,979 of Rousseau and 4,271,879 of Shivers, Jr. et al.

SUMMARY OF THE INVENTION

Accordingly, it is a primary feature of the present invention to provide novel stump removal apparatus which may be supported, raised, lowered and driven by a conventional tractor having a three point hitch.

It is also a feature of this invention to provide novel tree stump removal apparatus which is capable of efficiently reducing tree stumps to small size debris such as saw dust and wood chips which need not necessarily be transported from the stump removal site.

It is an even further feature of this invention to provide novel tree stump removal apparatus which may be simply and efficiently controlled for removal of tree stumps to the grade level of the ground or to grade levels either below or above ground level as desired by the user.

It is an important feature of this invention to provide novel tree stump removal apparatus which is supported by the three point hitch of a standard tractor and is driven by the power take-off and hydraulic systems of the tractor, thus minimizing the mechanical requirements and expense of the mechanism.

It is an even further feature of this invention to provide novel tree stump removal apparatus which may be simply and efficiently stored in readiness for use.

Briefly, tree stump removal apparatus constructed in accordance with the present invention incorporates a frame structure adapted for generally horizontal positioning relative to the ground surface and forming a pair of generally parallel elongated guide members which comprise a portion of the frame structure. A slide structure is provided with guide channels at opposite sides thereof for guiding engagement with the elongated guide members of the frame. A hydraulic cylinder is fixed to the frame structure with an operating shaft thereof in driving connection with the slide and thus being adapted to impart linear movement to the slide upon being energized through control of the hydraulic system of the tractor. A rotary cutter disk having tree trunk milling or cutting teeth removably fixed thereon is rotatably supported on the frame structure and is therefore movable along with the frame. The cutter is adapted to mill or shred away a tree stump from one side thereof as the cutter disk is simultaneously rotated and moved linearly by hydraulically induced movement of the slide structure. The cutter disk is capable of removing the stump to the level of the ground or to grade levels either above or below the level of the ground depending upon the desires of the user.

The frame structure incorporates a plurality of jack stands which are extended downwardly to elevate the frame from the ground for storage or positioned upwardly while the apparatus is being supported by a tractor. This feature permits lowering of the frame structure to ground level for removal of stumps below ground level since the outer periphery of the cutter disk extends below the lower level of the frame structure. The frame also incorporates vertical lifting eye structure enabling it to be lifted by lifting hooks such as for handling or transportation without attachment to a tractor.

The rotary cutter disk is in the form of a metal plate having a plurality of wood cutting or shredding teeth extending from one side and the peripheral portion thereof. The cutter disk is rotated by the power take-off system of the tractor while, at the same time, it is moved linearly against the side portion of the tree stump. The cutter disk is rotatably supported by a bearing secured to the slide structure. A non-circular drive opening is defined by the cutter which receives an elongated non-circular drive shaft extending across a tree stump opening formed by the frame member. The elongated drive shaft is rotated by the power take-off system of the tractor and maintains its driving relation with the rotary cutter during linear movement of the slide by the hydraulic cylinder. A very simple, low cost disk drive system is therefore provided which minimizes the total cost of the stump removal apparatus. The disk is enclosed by a protective housing having a suitable outlet for discharge of particles removed from the stump. Suitable collection apparatus may be provided at the housing discharge in the event the stump particles are to be collected for disposal away from the stump removal site.

BRIEF DESCRIPTION OF THE DRAWINGS

So that the manner of the above recited features advantages and objects of the present invention will become apparent and can be understood in detail, more particular description of the invention briefly summarized above, may be had by reference to the embodiment thereof which is illustrated in the appended drawings, which drawings form a part of this specification.

It is to be noted, however, that the appended drawings illustrate only a typical embodiment of this invention and are therefore not to be considered limiting of its scope, for the invention may admit to other equally effective embodiments.

IN THE DRAWINGS

Figure 1:
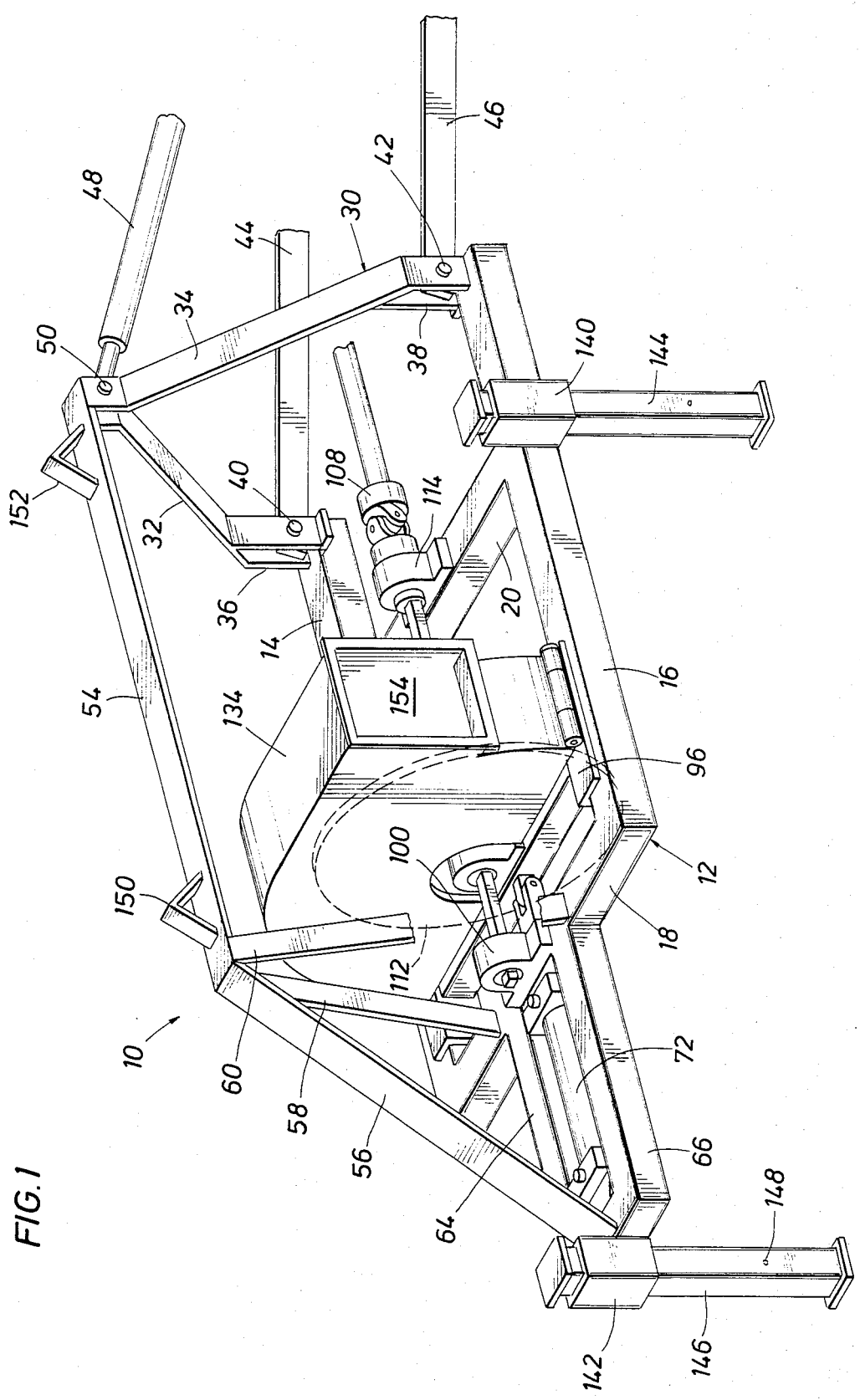

FIG. 1 is an isometric view illustrating tractor supported and operated stump removal apparatus constructed in accordance with the present invention and with the cutter disc thereof shown in the broken line.

Figure 3:
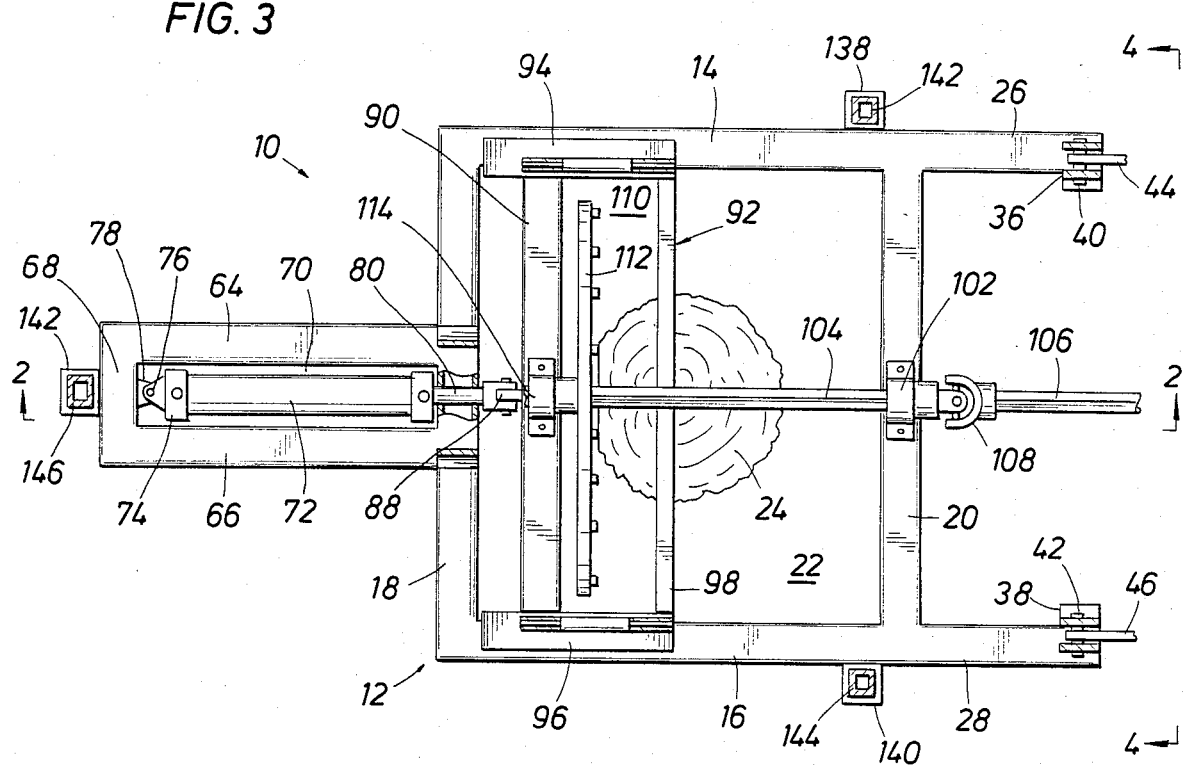
Figure 2:
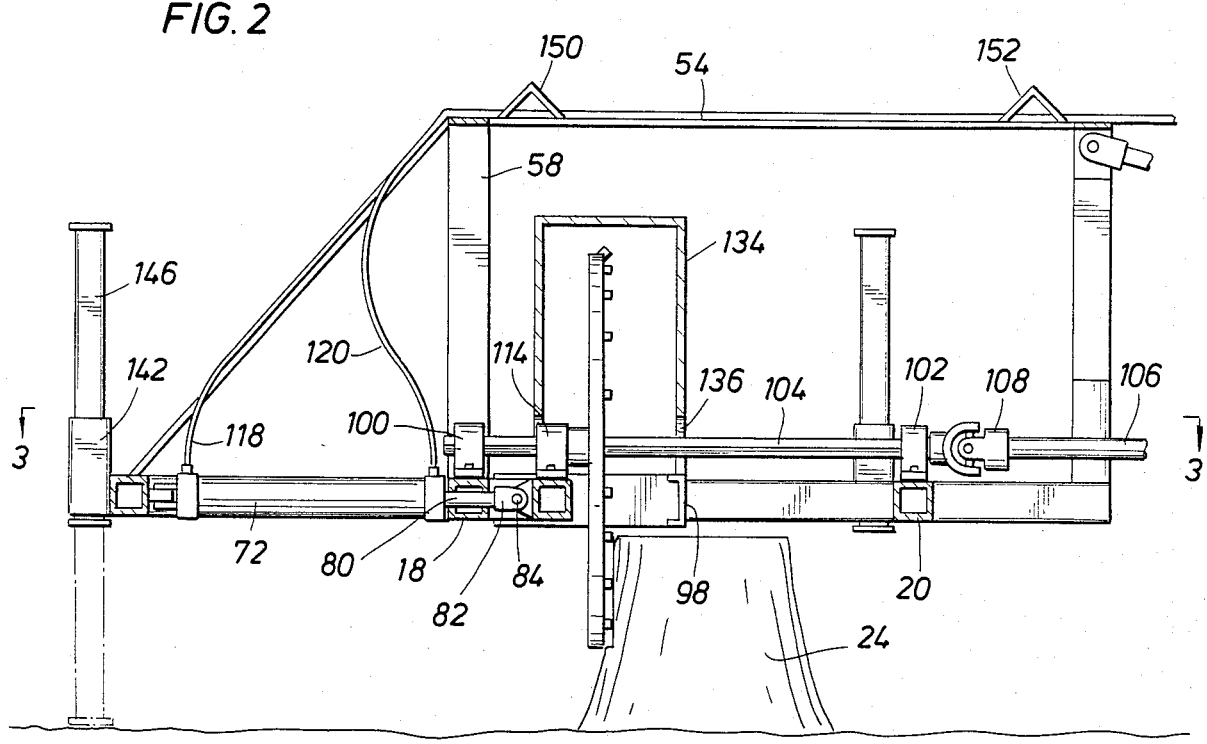

FIG. 2 is a sectional view of the tree stump removal apparatus taken along line 2—2 of FIG. 3 and shown in elevated position above the ground level and with the rotary cutter disk in cutting engagement with a tree stump.

FIG. 3 is a sectional view of the tree stump removal apparatus taken along line 3—3 of FIG. 2.

FIG. 4 is an end view of the tree stump removal apparatus of FIGS. 1-3 taken along line 4—4 of FIG. 3 and showing the apparatus in elevated position above the ground level and in operative cutting engagement with a tree stump.

FIG. 5 is a partial elevational view showing the cutting face of the rotary cutter disk and the drive connection between the disk and the non-circular drive shaft.

FIG. 6 is a fragmentary sectional view of the cutter disk taken along line 6—6 of FIG. 5 and showing the detailed construction of one of the peripheral cutters of the cutter disk.

DETAILED DESCRIPTION OF PREFERRED EMBODIMENT

Referring now simultaneously to FIGS. 1-4 of the drawings, a mechanism for removing tree stumps is provided generally at 10 which incorporates a tractor supported frame structure illustrated generally at 12. A major portion of the frame structure is of generally rectangular form and is defined by a pair of elongated structural frame members 14 and 16 which are disposed in substantially parallel relation and which are interconnected by means of a pair of transverse structural members 18 and 20. The frame members 14, 16, 18 and 20 corporate to define an opening 22 adapted to receive a tree stump 24 in the manner shown in FIGS. 2-4. The parellel structural members 14 and 16 define support extensions 26 and 28 to which are connected a three point hitch assembly illustrated generally at 30. The hitch assembly includes a pair of inclined load transmitting members 32 and 34 having bifurcated lower portions 36 and 38 defining clevis-like connections. A pair of connecting pins 40 and 42 extend through side members of the clevis structure for connection of hitch operating bars 44 and 46 of a tractor to the three point hitch structure. The hitch operating bars form a part of the tractor hitch structure as does the operating bar member 48. A connecting pin 50 extends through appetures in the upper parallel extremities of the load transmitting members 32 and 34 thus providing for connection of the free extremity of the lift bar 48 of the tractor to the upper portion of the three point hitch assembly. A pair of force transmitting straps 54 and 56 are provided to transmit forces from the three point hitch to the frame structure of the stump removal apparatus. Inclined structural members 58 and 60 are secured at the upper extremities thereof to the central force transmitting member 54 and are positioned in downwardly diverging manner with the lower extremities thereof secured to the transverse structural member 58.

The frame structure is provided with a rear extension shown generally at 62 which is formed by elongated parallel structural members 64 and 66 which are connected by welding or the like to the transverse structural member 18. A rear transverse structural member 68 interconnects with parallel structural member 64 and 66 and cooperates therewith to define a generally rectangular opening 70 within which is located a hydraulic cylinder 72. The rear end 74 of the cylinder is connected by a pin 76 to a connection tab or flange 78 extending forwardly from the structural member 68. At the forward portion of the hydraulic cylinder 72 the operating shaft 80 thereof extends through openings in the transverse structural member 18 thus positioning an operating clevis 82 at the free end of the operating shaft 80 within the rectangular opening 22 of the frame structure. The clevis 82 is connected by a pin 84 to a connecting tab member 88 extending from an elongated structural member 90 which forms a portion of a slide member shown generally at 92. Thus, as the hydraulic cylinder 72 is energized responsive to selection by the tractor operator, the operating shaft 80 of the cylinder imparts linear movement to the slide structure 92. The slide structure incorporates a pair of guide members 94 and 96 which are formed by elongated channel members having a C-shaped cross-sectional configuration with upper and lower flanges receiving the elongated structural members 14 and 16 in guiding relation therebetween. The slide structure may also includes a spaced transverse structural member 98 at the opposite side thereof which is also interconnected with the guide channels 94 and 96.

A pair of bearings 100 and 102 are fixed in aligned relation to the transverse structural members 18 and 20 of the framework in the manner shown in FIGS. 1 and 2. These bearings provide rotable support for a non-circular drive shaft 104 which is rotated by a power take-off shaft 106 extending from the power take-off of the tractor. The drive shafts 104 and 106 are interconnected by means of a universal joint in order to accommodate any shaft misalignment that might be present.

The slide assembly 92 forms an opening 110 within which is located a circular cutter plate or disk 112. The cutter disk 112 is rotatably supported by means of a bearing assembly 114 secured to the transverse structural member 90 of the slide assembly. Thus, the bearing assembly 114 and the disk 112 move linearly as the slide assembly 92 is moved upon energization of the hydraulic cylinder 72. The bearing support assembly for the cutter disk defines a non-circular drive opening as shown at 116 in FIGS. 4 and 5 which receives the non-circular drive shaft 104 in linearly movably, non-rotatable driving relation therein. As the drive shaft 104 is rotated, the cutter disk 112 is caused to rotate. As the slide assembly 92 is moved linearly by the hydraulic cylinder 72 the drive shaft 104 does not move linearly but rather merely continues its rotary movement responsive to its directly driven relationship with the drive shaft 106 of the tractor power take-off shaft. The rotary cutter disk, however, is advanced for cutting of the tree stump as the slide assembly 92 is advanced by the hydraulic cylinder 72. It shall be borne in line that the hydraulic cylinder incorporates hydraulic supply lines 118 and 120 which extend to the hydraulic supply system of the tractor. By appropriate manipulation of an actuating valve, the hydraulic cylinder and, consequently, the slide assembly 92 will be actuated in a selected forward or rearward direction.

As is evident from FIGS. 4 and 5, the cutter disk 112 is provided with a plurality of cutter teeth 122 which are removably secured thereto in accordance with a predetermined pattern. The pattern of the cutter elements is such as to insure that the cutter teeth traverse the entire face of the stump to be cut away during each resolution of the cutter. Since the cutter teeth are removably assembled to the cutter disk 112, they may be simply and efficiently replaced in the event they become worn or broken. As mentioned above, the stump cutting mechanism is capable of cutting to a level below ground in which case the cutter teeth are subject to abrasion by sand, dirt and other debris of the ground. Although the cutter teeth 122 are hardened and efficiently withstand abrasion and erosion, nevertheless, provision must be provided for replacement in the event the become sufficiently worn that cutting activity is diminished. The cutter disk must also be capable of cutting beyond the outer periphery of the disk. To facilitate such cutting activity, the cutter disk is provided with a pair of spaced peripheral cutter assemblies, one being shown generally at 124 and the other at 125. Cutter 124 is inclined forwardly with respect to the plane of the disc 112 to provide peripheral clearance and cutting face clearance while the peripheral cutter 114 is inclined rearwardly in relation with the plane of the disc 112 to provide rear clearance for the bolt heads of the cutting teeth. In each case, the cutter disk is formed to define a peripheral recess 126 and a transverse cutter support member 128 is fixed within an outer portion of the recess such as by welding or the like with the angle of the support member controlling the cutter tooth position. The support member 128 forms an aperture through which extends a shank portion of the cutter element 130. A nut 132 received by the threaded shank is tightened to secure the cutter member 130 in substantially immovable relation with the support element 128. It should be born in mind that the cutter element 130 may be substantially identical to the cutter elements 122 if desired. The peripheral cutters 124 and 125 are positioned within an angular section of the disc on the order of 60° to 70°. It is important that the angulated and coplanar peripheral cutter teeth transverse the stump face being cut in close proximity to facilitate simultaneous linear movement of the disc as it is rotated by the drive shaft.

A protective housing 134 is secured to the guide members 94 and 96 of the slide assembly and may also be secured to one or both of the transverse structural members 90 or 98 as desired. The side plates of the housing structure form openings such as shown as 136 through which the non-circular drive shaft 104 extends. The housing structure therefore travels along with the movable slide assembly and thus provides a protective enclosure about the rotating cutter disk. The housing is removably connected to the slide by hinge type receptacles which are retained in assembly by hinge pins. The housing can be pivoted relative to the slide by removing one of the hinge pins, or removed from the slide after both of the hinge pins have been removed.

While the apparatus shown in the drawing is disconnected from a tractor assembly, it is capable of being stored in an elevated position above ground level to thus provide it with a degree of protection from the ground environment and to prevent the cutter disk 112 from engaging the ground. A plurality of jack receptacles 138, 140 and 142 are secured to respective structural members of the frame. Each of these receptacles receives a jack stand such as shown at 142, 144 and 146 which is capable of selective positioning in either the extended position as shown in FIG. 1 or the retracted position as shown in FIGS. 2 and 4. Each of the jack stands defines one or more pin apertures 148 which receive pins to lock the jack stands in either the extended or retracted position as desired. In the extended position as shown in FIG. 1 the jack stands rest on the ground and therefore support the frame structure 12 in an elevated position. During use, the jack stands may be retracted as shown in full line in FIGS. 2 and 4, thus enabling the frame to be lowered into contact with the ground for positioning a cutter disc such that it enters the ground to its fullest depth to thereby facilitate removal of a stump below ground level. The degree of disc penetration below the level of the ground can be effectively controlled through positioning of the jack stands.

To further facilitate handling, the upper transverse structural member 54 is provided with lifting eyes 150 and 152 which permit movement of the stump removal mechanism by any suitable lifting apparatus such as for truck loading for relocation of it when a tractor is not available or when the apparatus is to be transported significant distances.

OPERATION

For stump removal operations, the connecting bars 44, 46 and 48 of a conventional tractor power take-off are interconnected with the three point hitch structure by means of the connecting pins 40, 42 and 50. The jack stands are then shifted to the retracted positions thereof, such as shown in FIGS. 2 and 4 thereby permitting the frame 12 to be lowered into contact with the ground if desired. The tractor will then transport the mechanism in elevated position above the ground and will sufficiently raise it to clear a stump 24 intended for removal. The tractor will then be backed up to position the opening 22 of the frame structure over the stump 24. Thereafter, the tractor lift will be lowered, thus lowering the frame to a suitable height relative to the stump 24. In this position, the hydraulic cylinder 72 will be so energized as to position the slide assembly 92 at its leftmost, retracted position as shown in FIGS. 1, 2 and 3. The power take-off of the tractor will then be energized, thereby rotating the drive shaft 106 and thus causing rotation of the driven shaft 104. The driving interconnection between the non-circular shaft 104 and the non-circular opening 116 of the cutter causes the cutter plate to rotate while being supported by its bearing assembly 114.

At this time the hydraulic cylinder 72 will be energized causing the drive shaft 80 to move forwardly toward the tractor and thereby driving the slide assembly 92 and the rotary cutter disk 112 toward the stump 24. As the cutter disk 112 advances, the cutter teeth 122-130 engage the stump and begin cutting it away. The sawdust and wood chips that are removed from the stump will be ejected through an opening 154 of the protective housing 134 to thus insure that the operator of the tractor is not in danger by flying woodchips and other debris. If desired, a suitable receptacle may be connected at the housing opening 54 to receive the sawdust and woodchips that are thus developed. The hydraulic cylinder and its shaft are of sufficient length that a stump will be completely cut away in a single pass. In the event the stump is of greater height than the cutting depth of the cutter disk after an initial pass, cutting away the upper portion of the stump, the slide assembly 92 will again be retracted by the hydraulic cylinder. Thereafter the frame will be lowered and the hydraulic cylinder energized to move the slide assembly and the cutter across the stump again, thus removing the stump to a lower level, including below ground level, if desired. If desired, the rotating stump cutter disk may be inserted into the ground while rotating by simultaneously lowering the frame toward the surface of the ground. In fact, the frame may be lowered into contact with the ground if desired and the hydraulic cylinder may be energized to cause cutter traversing below ground level. Obviously the rotating cutter will dig a trench below ground which, of course, must be filled after the stump has been removed if a trench in the ground is undesirable.

It is therefore seen that this invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. Tractor supported and operated stump removal apparatus, comprising:
    (a) a frame structure adapted to be supported, raised and lowered by the hitch structure of the tractor;
    (b) slide means being positioned for guided reciprocal movement on said frame structure;
    (c) means for imparting linear reciprocal movement to said slide means;
    (d) a non-circular drive shaft being mounted for rotary moement on said frame structure and adapted to be driven by the power take-off of the tractor; and
    (e) a rotary cutter element being rotatably mounted on said slide means and movable along with said slide means, said rotary cutter element having means providing sliding, non-rotatable relation with said drive shaft, whereby said cutter element is rotated by said drive shaft and is capable of simultaneous linear movement by said linear reciprocal movement imparting means.

2. Stump removal apparatus as recited in claim 1, wherein:
    (a) said frame structure defines a substantially planar lower surface adapted to be lowered into contact with the ground; and
    (b) said cutter element defines an outer periphery extending below said planar lower surface and adapted to remove tree stumps both above and below ground level.

3. Stump removal apparatus as recited in claim 2, wherein:
    said cutter element defines a cutting face directed in substantially normal relation with ground level and adapted to cut away tree stumps from the side portions thereof upon being moved linearly along with said slide means.

4. Stump removal apparatus as recited in claim 3, wherein said rotary cutter element comprises:
    (a) a rotary element defining a substantially circular cutting face; and
    (b) a plurality of hardened cutter teeth being removably secured to said rotary element and presenting said cutter teeth in a rotary pattern such that each revolution of said rotary element causes said cutter teeth to collectively define a wide cutting path extending from the bottom of said structure to a position below the outer periphery of said rotary element.

5. Stump removal apparatus as recited in claim 1, wherein:
    (a) said rotary cutter element forms a substantially planar cutting face and defines peripheral tooth receptacle means inclined with respect to said cutting face; and
    (b) removable tooth means being supported by said peripheral tooth receptacle means and defining a cutting portion extending forwardly of said cutting face and radially outwardly beyond the outer periphery of said cutting face.

6. Stump removal apparatus as recited in claim 5, wherein:
    (a) said rotary cutter element is a generally circular disc having at least one recess formed in the outer peripheral portion thereof:
    (b) peripheral tooth support means is retained within said recess and forms tooth retaining aperture means oriented in inclined relation with said disc;
    (c) peripheral cutter tooth means being removably positioned within said tooth retaining aperture means and forming a stump cutter tooth means positioned beyond the outer periphery of said disc and beyond said cutting face.

7. Stump removal apparatus as recited in claim 5, wherein said peripheral tooth support means comprises:
    two peripheral tooth support means and peripheral cutter tooth means located within a 90° segment of the outer periphery of said rotary cutter element.

8. Stump removal apparatus as recited in claim 4, wherein:
    (a) said cutter element is a substantially flat circular plate forming a plurality of cutter openings at preselected positions thereon;
    (b) said cutting teeth define chisel cutting edges and form threaded connecting shanks extendable through said cutter openings; and
    (c) nut means being received by said threaded connecting shanks and securing said cutting teeth in substantially fixed relation with said circular plate.

9. A tractor supported and driven mechanism for removing tree stumps, comprising:

(a) a frame structure adapted for generally horizontally positioning relative to the ground surface and forming spaced elongated guide members;

(b) three point hitch means for connection of said frame structure to implement lifting apparatus of a tractor;

(c) a slide structure being movably positioned in sliding engagement with said elongated guide members;

(d) a hydraulic cylinder being supported by said frame structure and having linear driving connection with said slide structure; and (e) a rotary cutter disc being rotatably supported by said slide structure and adapted to cut away a stump from one side thereof as said cutter disc is rotated and moved linearly responsive to linear movement of slide structure, said cutter disc extending to a level below said frame and being capable of removing said stump to a grade below ground level, said cutter disc incorporating means providing independent rotation thereof by the power-take-off of said tractor and permitting independent movement thereof in linear manner upon linear movement of said frame structure by said hydraulic cylinder.

10. A mechanism for removing tree stumps as recited in claim 9, wherein:

(a) a non-circular drive shaft is mounted for rotation on said frame structure; and (b) said cutter disc is received in driving, sliding engagement by said non-circular drive shaft and is rotated by said drive shaft independently of linear movement of said cutter disc along with said slide structure.

11. A mechanism as recited in claim 10, wherein:
said non-circular drive shaft is adapted for driving connection with the power take-off of the tractor.

12. A mechanism as recited in claim 10, wherein:
protective housing means is releasably secured to said slide structure and encloses the upper portion of said cutter disc, said protective housing means defining a discharge opening through which wood chips and debris are ejected in a direction substantially normal to said drive shaft.

13. A mechanism as recited in claim 9, wherein:

(a) said frame structure forms a substantially planar lower surface adapted for selective positioning in elevated position above the ground or in contact with the ground; and (b) said cutter disc extending below the level of said planar lower surface for cutting beneath ground level.

14. A mechanism as recited in claim 13, wherein:

(a) a plurality of jack holders are connected to said frame structure; and (b) a plurality of jack stands are received respectively by said jack holders and are positionable in extended relation for support of said frame structure in elevated position above the ground or in retracted relation enabling said frame to be lowered to ground level.

15. A mechanism as recited in claim 9, wherein:
said frame structure forms an opening having said guide members disposed in parallel relation on opposite sides thereof, said guide members being oriented in substantially parallel relation with the rotational axis of said cutter disc.

16. A mechanism as recited in claim 9, wherein:

(a) said frame structure is of generally horizontal form having a forward portion and a rear portion, said rotary cutter disc being positioned for linear movement between said forward portion and said rear portion;

(b) a three point hitch connection is provided at said forward portion of said frame structure forming spaced lower hitch elements and a central elevated hitch element; and (c) force transmitting structural means are connected to said central elevated hitch element and extend over said cutter element, said force transmitting structural means being connected to said rear frame portion.

* * * * *